United States Patent [19]

Ogawa et al.

[11] Patent Number: 4,529,304
[45] Date of Patent: Jul. 16, 1985

[54] ZONE SENSING APPARATUS

[75] Inventors: Masahiko Ogawa, Tokyo; Shuichi Tamura; Mutsuhide Matsuda, both of Kanagawa; Takao Kinoshita, Tokyo, all of Japan

[73] Assignee: Canon Kabushiki Kaisha, Tokyo, Japan

[21] Appl. No.: 355,248

[22] Filed: Mar. 5, 1982

[30] Foreign Application Priority Data

Mar. 10, 1981 [JP] Japan .................................. 56-34371

[51] Int. Cl.³ ............................ G01C 3/10; G03B 7/08
[52] U.S. Cl. ........................................ 356/1; 354/403
[58] Field of Search ..................... 356/1, 4; 354/25 R, 354/25 A, 25 N, 25 P, 403

[56] References Cited

U.S. PATENT DOCUMENTS

| | | | |
|---|---|---|---|
| 3,736,057 | 5/1973 | Harvey | 356/4 |
| 3,759,614 | 9/1973 | Harvey | 356/1 |
| 3,813,679 | 5/1974 | Hasegawa et al. | 354/25 A |
| 3,820,129 | 6/1974 | Hosoe et al. | 354/25 A |
| 3,936,187 | 2/1976 | Momose | 356/1 |
| 4,322,141 | 3/1982 | Tominaga | 354/25 A |

Primary Examiner—S. C. Buczinski
Attorney, Agent, or Firm—Toren, McGeady, Stanger, Goldberg & Kiel

[57] ABSTRACT

The disclosed apparatus determines optically whether an object is located within a first range of distances from the apparatus or a second range of distances from the apparatus. A radiation projecting arrangement projects a beam towards the object and a receiving arrangement disposed a predetermined distance transverse to the object direction receives the radiation reflected from the object. A pair of radiation sensors in the receiving arrangement each produce an electrical output corresponding to the received radiation. A circuit responds to the outputs of the sensors to determine whether the object is located within a first range or a second range. The circuit arrangement connects the radiation sensors so as to subtract their outputs, and one of the sensors is provided with a more extensive radiation receiving area than the other. This extends one of the range of distances.

4 Claims, 8 Drawing Figures

ZONE SENSING APPARATUS

BACKGROUND OF THE INVENTION

1. Field of the Invention

This invention relates to zone sensing apparatus, and more particularly to zone sensing apparatus of the active type in which a light projector and a light sensor are fixedly arranged in spaced relation to each other along a predetermined base line so that as the light projector gives off light, the light reflected from the object is received by the light sensor to find the distance zone of the object.

2. Description of the Prior Art

In the active type of zone sensing apparatus, the target area is divided into a near distance zone and a far distance zone. When an object lies in the near distance zone, a light sensor receives the reflected light from the object on which the light projector projects light. While the light projector is giving off light toward the target area, an arrangement detects whether or not the output of the light sensor responsive to the reflected light exceeds a predetermined critical level. When the critical level is exceeded, the object is found to be in the near distance zone, and when not exceeded, to be in the far distance zone. (Such active type zone sensing apparatus is disclosed, for example, U.S. Pat. No. 3,512,888). That is, the zone of the object is determined depending upon whether or not the light sensor receives the projected light from the light projector after having been reflected by the object. However, in order to insure that the accuracy of discrimination is maintained constant independently of the reflectance of the object, it is necessary for the distance between the light projector and the light sensor, that is, base length to have sufficiently large.

However, as the base length increases, the apparatus suffers a loss in compactness. Therefore, a much-desired increase in the base length cannot be made beyond a natural limit. Although these apparatuses are suitable for two-zone type simple automatic focus adjusting devices for compact optical instruments such as mid-price cameras, it is very difficult to assure the availability of a sufficiently long base length. Thus, in is the present state of art, improving the accuracy of detection cannot be fully achieved.

Aside from the loss in detection accuracy, the use of a base length of insufficient dimension causes other problems because of the concurrence of a small difference in the angles of incidence for near and far object distances. For example, highly reflective object at the a farther distance may be determined to be in the near distance zone. Conversely, when the object at a near distance has a low reflectance, it may be detected as being in the far distance zone. Such erroneous detection makes the requirement for adequate performance difficult to fulfil.

Also in order to maintain detection accuracy at a given level independently of the reflectance, the range of projection of light from the light projecting means may be narrowed with an increase in the projected light energy. However, when the target area which the light projecting means passes through is narrowed, the required area of the near distance zone can no longer be covered, and an abnormal drop of the output level of the light receiving means takes place particularly for close distances. This leads to incorrect detection of an object in the near distance zone as being in the far distance zone. Such an unfavorable situation is more often encountered when the angular field coverages of the light projecting and receiving means are made equal to each other.

SUMMARY OF THE INVENTION

With the foregoing in mind, it is an object of the present invention to provide a zone sensing apparatus of the active type described with means making it possible despite the base length between the light projecting and receiving means being kept small, to improve its detection accuracy to a high level and to assure a sufficiently high standard of sensing performance, whereby particularly for close distances there is avoided occurrence of an erroneous discrimination in advance, thus contributing to a further increase in the accuracy and reliability of discrimination of the complete apparatus.

To this end, the zone sensing apparatus of the invention is made to have a form that the light projecting means and the light receiving means are arranged in fixedly spaced relation to each other by a predetermined base length upon projection of light from the light projecting means to receive the reflected light from an object in the target area by the light receiving means, thereby the object lying zone is discriminated, being characterized in that the light receiving means has an angular field coverage extended so as to include nearer distances in relation to the range of projection of light from the light projecting means.

According to a preferred embodiment of the present invention which will be more fully described later, it is proposed for the above-described zone sensing apparatus to employ a more advantageous form that the aforesaid light receiving means is provided with two photosensitive elements positioned adjacent to each other so that the reflected light from the object is received by said two photosensitive elements at a time, whereby said two photosensitive elements are connected to a circuit to subtract their outputs, the output of the circuit representing which of the two zones contains the object, and either one of the aforesaid two photosensitive elements, preferably the one which is responsive to the reflected light from the near distance zone, has a light receiving region extending towards even nearer distances.

In this connection, it is noted that the use of two adjacent photosensitive elements for one light projecting means, or the thus-formed active type zone sensing apparatus is already known, for example, in U.S. Pat. Nos. 3,443,502 and 3,736,057. In these conventional apparatuses the light receiving areas of the two photosensitive elements are equal to each other. The improved present invention has a feature of novelty in that the light receiving area of one of the two photosensitive elements is made larger than that of the other.

These and other objects and features of the invention will become apparent from the following detailed description of an embodiment taken in conjunction with the accompanying drawings in which:

DETAILED DESCRIPTION OF THE PREFERRED EMBODIMENT

Figure 1:
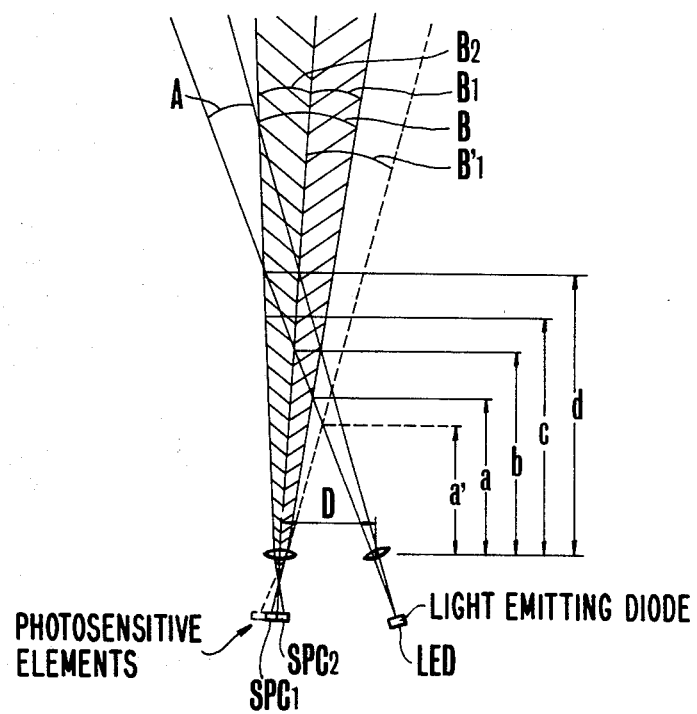
FIG. 1 is a diagram the principles of zone discrimination in the embodiment of the zone sensing apparatus according to the present invention, and particularly the relationship of the light projecting and receiving ranges of the light projector and light sensor in the target area and the relationship of the divided zones of the target area.

FIG. 1 discloses the principles of zone detection of the zone sensing apparatus according to the present invention. In FIG. 1, is a light projecting element LED such as an infrared or near infrared emitting diode, and a projection lens L1 in front of the diode LED are fixedly arranged and form a light projecting arrangement. Photosensitive elements SPC1 and SPC2 such as silicon photocells are positioned adjacent each other and in laterally spaced relative to the light projecting element LED by predetermined distance. A light collecting lens L2 positioned in front of the photosensitive elements is arranged at a predetermined base line length D laterally from the projections lens L1. The parts SPC1, SPC2, and L2 are fixedly arranged and form a light receiving arrangement. In this case, the central point CR on the boundary between the light receiving areas of the photosensitive elements SPC1 and SPC2 lies on an optical axis of the lens L2. (see FIG. 2) A relationship between the light projecting range of the light projecting arrangement and the light receiving range of the light receiving arrangement is previously set such that, when an object lies on the near side of a boundary C, for example this, the first photosensitive element SPC1 receives a larger proportion of the reflected light from the object. When the object is further than the boundary C, the second photosensitive element SPC2 receives a larger proportion of the reflected light. Thus, while the light projecting element LED is giving off light, detecting which photosensitive element, SPC1 or SPC2, receives a greater proportion of the reflected light from the object, based on their output levels, it serves to discriminate between an object distance nearer or farther than the distance C.

This detection is explained in more detail with reference to the circuit of FIG. 3. Here, an oscillator circuit OSC whose output pulses after having been frequency-divided by a frequency divider-dispatcher circuit DDC are applied to a light projecting element drive circuit DRC. Pulses from the latter drive the light projecting element LED. Therefore, the light projecting element LED gives off a pulsating light distinguishable from the ambient light. The thus-projected pulsating light from the light projecting arrangement is reflected from the object, and sensed by the light receiving arrangement. The photosensitive elements SPC1 and SPC2 are connected to each other in reverse parallelism so as to cancel out their outputs (photocurrents) and are connected across two inputs of an amplifier AP. The difference between their output photo-signals is converted to a voltage by an amplifier AP having a feedback resistor R1.

Figure 4:
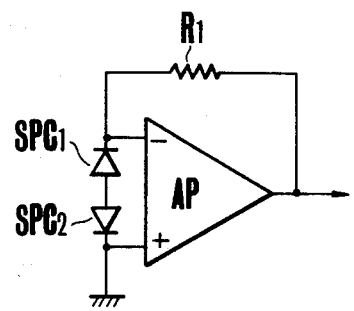
FIG. 4 is a fragmentary circuit diagram of another example of connection of the two photosensitive elements.

Another method of connecting the photosensitive elements SPC1 and SPC2 relative to the amplifier AP is illustrated in FIG. 4. Here, the elements SPC1 and SPC2 form a series connection of opposing poled elements across the inputs of the amplifier AP to effect an equivalent result.

Figure 3:
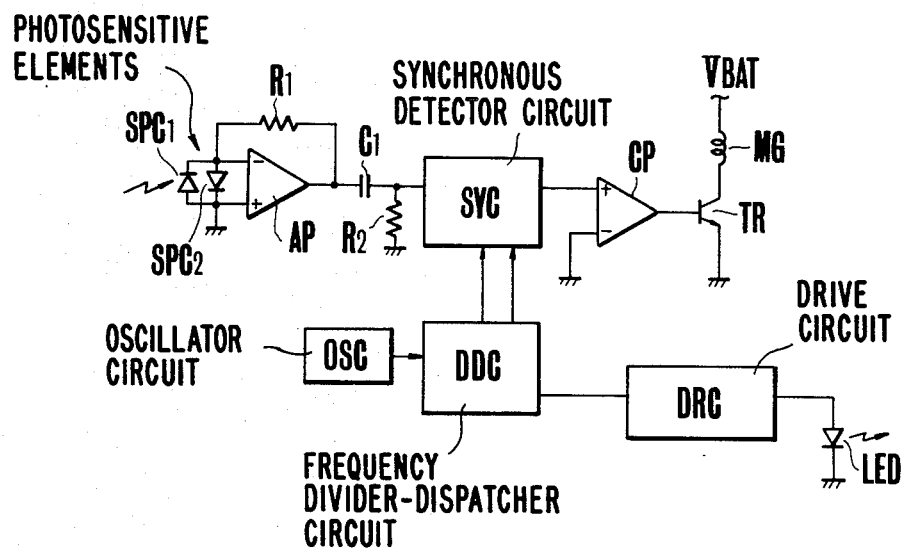
FIG. 3 is a schematic electrical circuit diagram, partly in block form, of an example of electrical circuitry of the above-described zone sensing apparatus.

The output of the amplifier AP in FIG. 3 is then processed by a high pass filter comprising a capacitor C1 and a resistor R2 to remove the low frequency components due to bias noise such as natural light and further by a synchronous detector circuit SYC cooperating with a frequency divider-dispatcher circuit DDC to be converted to a D.C. voltage. This is produced as a detection output. The detection output is applied to a comparator CP at the non-inverting input thereof, when the inverting input receives zero voltage to establish a critical level.

Now, with a circuit of such construction, if the detected output from the synchronous detector circuit SYC is positive, the output of the comparator CP becomes high to indicate that the first photosensitive element SPC1 is receiving a more reflected light from the object than the second. Otherwise, if the detected output is negative, the output of the comparator CP assumes a low level, which indicates that the second photosensitive element SPC2 is receiving a more reflected light from the object. Thus, it is possible to discriminate between an object in the near distance zone and the far distance zone with the distance C as the boundary, on the basis of the high and low levels of the output of the comparator CP.

The zone sensing apparatus of the character described above is easily applicable to the two-zone type automatic focus adjusting devices. That is, for example, the lens is urged by a spring or the like to move forward, that is, to focus down to shorter object distances, and a releasable latch member is used in latching the lens against the spring force at a position for focusing on the distance zone farther than the above-defined distance C. A stationary stop member is provided for stopping movement of the spring-powered lens at a position for focusing on the distance zone nearer than the distance C. Latching and releasing the lens by the latch member is controlled by an electromagnet MG connected to a switching transistor TR that responds to the output of the comparator. Now assuming that the object lies in the far distance zone, the output of the comparator CP is low so that, the transistor TR remains non-conducting. Therefore, the electromagnet MG is not energized, thereby permitting the lens to remain latched by the latch member in the focusing position for the far distance zone. Alternatively assuming that the object lies in the near distance zone, then the output of the comparator CP becomes high, so that the transistor TR is turned on to energize the magnet MG. Therefore, the latch member is actuated to release the lens from its latched condition. Then the lens is moved by the force of the spring to the focusing position of the near distance zone, and is stopped by the stopper member in that focusing position.

Thus, it is possible to form a simple automatic focus adjusting apparatus of the 2-zone type, and such an automatic focus adjusting apparatus is particularly suited for use in medium priced cameras.

Figure 2A:
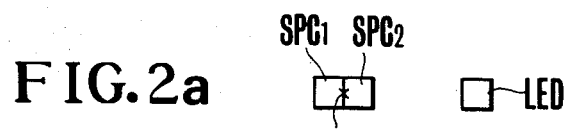
FIG. 2(a) is a schematic plan view illustrating an example of form of a combination of the light projecting and photosensitive elements.
Figure 2B:
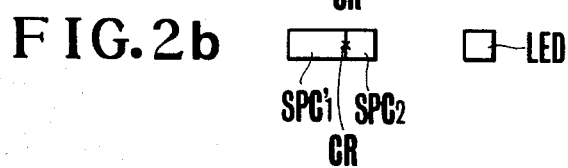
FIG. 2(b) is a similar view illustrating another example of form of a combination of the light projecting and photosensitive elements according to the present invention.

Now turning again to the discussion of the improvements of the invention, we assume that, in the arrangement of the light projecting and receiving elements of FIG. 2(a), there is only one photosensitive element, for example, the SPC1, and that when this receives the reflected light from the object, the near distance zone is detected, and when not, the far distance zone is detected. Then the light projecting range of the light projecting means (which is determined by the relationship of the light emitting area of the light projecting element and its directional characteristics with the focal length of the projection lens) and the light receiving range of the light receiving means (which is determined by the relationship of the light receiving area of the photosensitive element with the focal length of the collector lens) become the type such as illustrated by A and B1 in FIG. 1. In that case, the detected output (that is, the output of the synchronous detector circuit SYC of FIG. 3) in the form of the output of the single photosensitive element SPC1 varies with the object distance as, for example, illustrated by points (2), (6) and (4) in FIG. 5. Here, the light projecting and receiving ranges A and B1 of the light projecting and receiving arrangements are set as illustrated in FIG. 1. The distance d from the apparatus is the boundary. When the object lies nearer than d, because the photosensitive element SPC1 receives the reflected light, the near distance zone, is detected. When the object is farther than this, because the element does not receive the reflected light, the far distance zone is detected. In this case, due to the difference of reflectance of the object, errors in discrimination between zones may be assumed to occur with a greater probability in a region O to V of the output of the detector. From the distance standpoint, as is understandable from FIG. 5, the possibility of an error in discrimination very rapidly increases in a region indicated by X with the center thereof at the distance d being taken as the standard. In more detail, even though the object distance is somewhat farther than the distance d if the object has a very high reflectance, it cannot be denied that the photosensitive element receives some of the reflected light as a stray light. Therefore this may effect a detection in the near distance zone. Or conversely, even though the object lies at a somewhat nearer distance than the distance, d, if the reflectance of the object is very low, the reflected light incident upon the photosensitive element is very weak, causing erroneous detection as if the object were in the far distance zone. The region X for which such erroneous discrimination has a high possibility of occurring must be shortened as much as possible. For this purpose, the variation of the detection output in the region between the points (6) and (4) of FIG. 5 may be steepened. To do this, the above-described base length D must be set at a sufficiently large value. However, as has been pointed out, the large limitation on the setting of this base length D, in actual practice for example, in small size instruments such as compact cameras, makes it impossible to assure the availability of a sufficiently long base length.

In contrast, as illustrated in FIG. 2(a), the use of a second photosensitive element SPC2 for detection of the far zone in addition to the aforesaid photosensitive element SPC1, arranged side by side, increases the light receiving range of the entire light receiving arrangement to B=B1+B2 where B2 is the light receiving range of the second photosensitive element SPC2 as illustrated in FIG. 1. In this case, it is necessary that as has been explained in connection with FIGS. 3 and 4, that these two photo-sensitive elements SPC1 and SPC2 be connected to subtract their outputs. Then, the concurrent output (that is, the output of the synchronous detector circuit SYC) varies with the object distance as indicated by the polygonal line passing the points (2), (6), (3), (7) and (8) in FIG. 5. Here suppose that the erroneous detection due to difference of the reflectance of the object is liable to occur in a range of the detection output from +V to −V. In terms of distance the portion of the target area Y with its center at the standard point of distance C at the boundary has a high probability of detection errors. Upon comparison with the aforesaid region X, it can be realized that a remarkable reduction has been achieved, thanks to the steepened slope of variation of the detection output in the region between the points (6) and (7). While the actual base length D is left unchanged, a result equivalent to an increase in the effective base length has been achieved.

Thus, without recourse to a change in the actual base length, the apparent base length is advantageously increased. This makes it possible to achieve improvements in detection accuracy and performance.

Figure 6A:
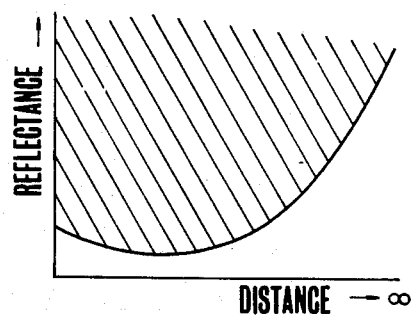
FIGS. 6(a) and 6(b) are graphs illustrating how the distance of the boundary between the two zones as sensed depends upon the reflectance of the object, with FIG. 6(a) representing a case where the number of photosensitive elements is one, and FIG. 6(b) representing the embodiment of the invention.
Figure 6B:
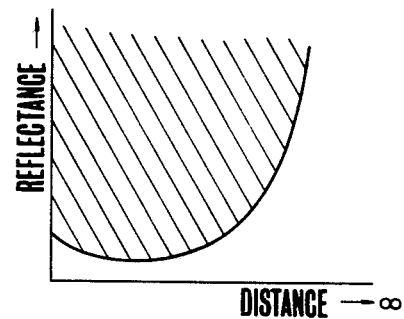

How the shift of the boundary between the near and far distance zones as sensed differs when only one photosensitive element is used as mentioned above, and when the second photosensitive element SPC2 is added, is illustrated in FIGS. 6(a) and 6(b). FIG. 6(a) illustrates the relationship of the boundary object distance with the object reflectance when only one photosensitive element is used. The hatched area represents a region for which the near object distance zone is detected. This reveals that the boundary distance on the discrimination of the far and near, or two zones is caused to shift to large extend depending upon the reflectance. On the other hand, FIG. 6(b) depicts a similar relationship using two photosensitive elements (where the base length D remains unchanged). As is evident from the graph, the dependency of the shift of the boundary distance on the reflectance is very much diminished.

The invention is that, for example, if the collector lens L2 may have a poor imaging performance so that the reflected light may be focused to a blurred spot image on the light receiving area of the photosensitive element. With a single photosensitive element, the variation of the slope of the detection output in the region between the points (6) and (4) of FIG. 5 will become more gradual due to the blurring of the sensed image. By contrast, according to improvements of the invention, the outputs of the two photosensitive elements are combined with each other so that the influence of the blurred image can be fully avoided. Therefore, the requirement for adjustment of the optical parts is not as rigorous. Even when the adjustment is more or less rough, an unduly large loss in the detection accuracy can be prevented.

A further advantage arising from the connection of the two photosensitive elements in opposing directions is that the noises due to the ambient light such as daylight in the photo-signals can be effectively cancelled out to obtain a noise-free detection output. Therefore, a further increase in the detection accuracy can be facilitated.

Figure 5:
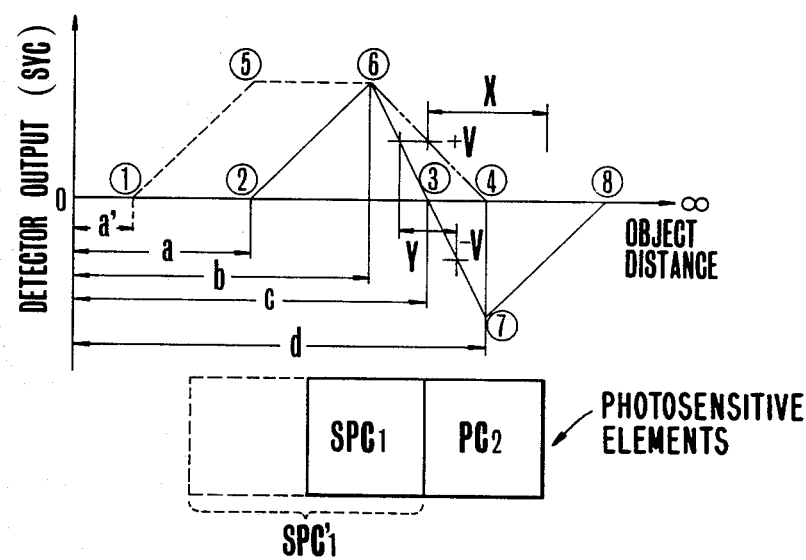
FIG. 5 is a graph illustrating variations of the output of the detector circuit with the object distance when the combinations of the light projecting and receiving elements illustrated in FIGS. 2(a) and 2(b) are used and when only one photosensitive element is used.

As shown in FIGS. 1 and 5, the combination of the light projecting and receiving elements LED, SPC1 and SPC2 of FIG. 2(a) is limited on the near end to a detectable range of a distance, a. In order to extend this distance, according to the present invention, the near distance zone sensing element has its direction of the base line increased as illustrated at SPC1' in FIG. 2(b). This extend the target area in the near distance zone from the B1 to a B'1 in FIG. 1, in other words, towards nearer distances. And, this causes the mode of variation of the detection output (the output of the synchronous detector circuit SYC) with the object distance to change as illustrated by a polygonal line passing the points (1), (5), (6), (3), (7) and (8) successively in FIG. 5. Thus, the boundary between the target area and the blind area is shortened from the distance, a, to a distance, a', with a corresponding increase in the closeup range.

The invention furnishes an improved active type zone sensing apparatus despite the impossibility of forming a long base length between the light projecting and receiving arrangement. Moreover, the invention prevents an erroneous detection which otherwise would be very likely to occur particularly at close distances. This results in achieving the possibility of improving the zone discriminating performance over the entire target area. In application to such apparatus, therefore, a great advantage can be expected from the invention.

It should be further pointed out that in the embodiment the two photosensitive elements are connected to the signal processing circuit so as to subtract one of their outputs from the other. Therefore, even when the spot image on the photosensitive elements is, for example, blurred, a loss in the accuracy which would be otherwise result can be avoided. Another additional advantage arises from the effective removal of the adverse influence of noise light than the signal light other emitted from the apparatus. This contributes to a further increase in the reliability of zone discrimination.

What is claimed is:

1. A zonal range finding apparatus for determining whether an object is located within a first range of distances from the apparatus, or a second range of distances nearer than the first range of distance from the apparatus, said apparatus comprising:
    (A) a radiation projection means for projecting a beam of radiation towards the object;
    (B) a radiation receiving means for receiving radiation reflected by the object, said receiving means being disposed a predetermined distance along a base line from said projecting means and having a first radiation receiving zone and a second radiation receiving zone arranged along the base line so that when the object is in the first range of distances, a greater amount of radiation reflected by the object is received in the first radiation receiving zone than that of the second radiation receiving zone, while when the object is in the second range of distances a greater amount of radiation reflected by the object is received in the second radiation receiving zone than that of the first radiation receiving zone, said first radiation receiving zone and said second radiation zone each producing electrical outputs in accordance with the amount of received radiation, said second radiation receiving zone being longer along the base line than said first radiation receiving zone; and
    (C) circuit means for determining, on the basis of the outputs of said pair of sensors in said receiving means, whether the object is located within said first range or said second range.

2. The apparatus according to claim 1, wherein said radiation projecting means is arranged to project a radiation beam modulated with a predetermined frequency, and said circuit means includes means for extracting a signal component of the radiation beam projected by the projecting means from the outputs of said pair of radiation receiving zones in said radiation receiving means.

3. An apparatus as in claim 1, wherein said radiation zones are adjacent one another and a common boundary is formed between them.

4. A zonal range finding apparatus for determining the distance of an object according to a position at which a reflected signal is received, said apparatus comprising:
    (A) a radiation projection means for projecting a beam of radiation towards the object;
    (B) a radiation receiving means for receiving radiation reflected by the object, said receiving means being disposed a predetermined distance along a base line from said projecting means and having two signal receiving zones in which the ratio of the amount of the received signal changes according to the position at which the reflected signal is sensed, whereby according to the ratio in the afore-mentioned two signal sensing zones it is judged whether said object is at a far distance or a near distance and the zone in which it is judged that the object is at the near distance is longer along the base line than the zone in which it is judged that the object is at the far distance.

* * * * *